Feb. 19, 1952 W. O. DAVIS 2,586,619
FLOAT DRIVE MECHANISM FOR LIQUID LEVEL INDICATORS
Filed Oct. 26, 1945 2 SHEETS—SHEET 1

INVENTOR
Wilfred O. Davis
By Watson, Cole, Grindle
+ Watson

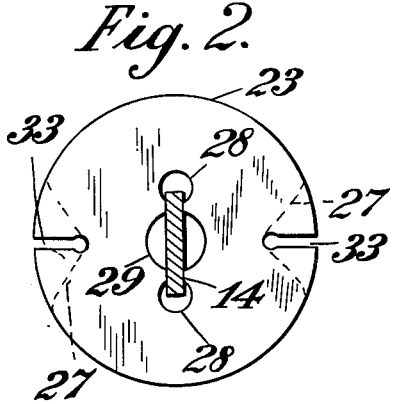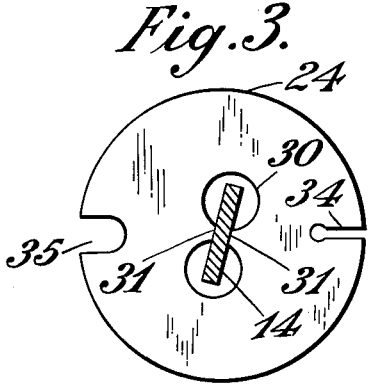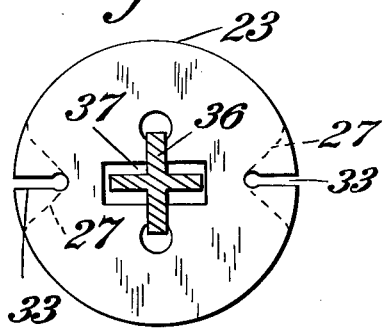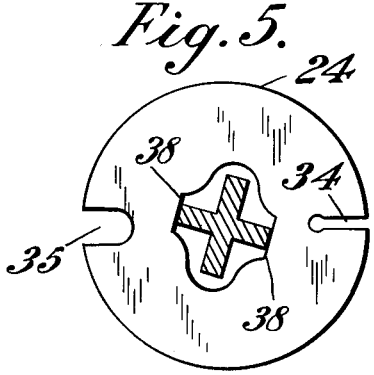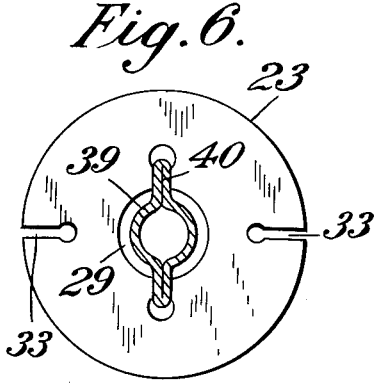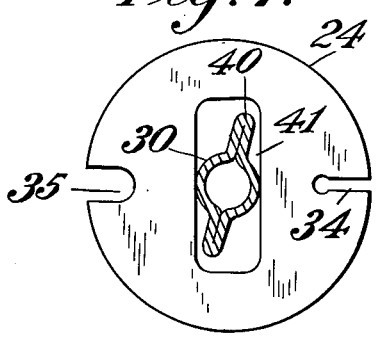

Patented Feb. 19, 1952

2,586,619

UNITED STATES PATENT OFFICE 2,586,619

FLOAT DRIVE MECHANISM FOR LIQUID LEVEL INDICATORS

Wilfred Owen Davis, Cricklewood, London, England, assignor to S. Smith & Sons (England) Limited, London, England, a British company Application October 26, 1945, Serial No. 624,762
In Great Britain September 27, 1944

9 Claims. (Cl. 137—104)

This invention relates to float-controlled apparatus for liquid level indicators and like mechanism responsive to changes of level of a liquid, and has for an object to provide a compact arrangement suitable for use in petrol tanks, particularly petrol tanks for aircraft.

The invention is concerned with that type of float-controlled apparatus in which guide means are provided for constraining the float to move rectilinearly in an up-and-down direction, and in which means are provided for converting said rectilinear movement to rotary movement. Heretofore, this type of apparatus has been liable to obstruct the rectilineal movement of the float so that the float may only intermittently follow the changes of liquid level, and a further object of the present invention is to overcome or minimise the above effect.

According to this invention, a float-controlled apparatus of the type referred to above, is characterised in that the float is arranged to be engaged by two guide means, one permitting, in a plane at right-angles to said rectilinear path, freedom of movement of the float in one direction only and the other permitting, in the said plane, relative movement between the other guide means and the float only in a direction at right-angles to the first said direction, and in that one of said means comprises a helically shaped member arranged to provide for relative rotation between it and said float, thereby providing the aforesaid means for converting rectilineal movement into rotary movement.

It will be appreciated that the provision for the above freedom of movement prevents any inaccuracies in the formation of the two guide means in a direction transverse to said rectilineal movement from causing obstruction to the movement in an up-and-down direction.

In one form of construction, the aforesaid helically shaped member is rotatably mounted and is fixed against axial movement, while the other member is arranged to restrain the float against rotation but permits movement in said rectilineal path. Thus, should the helical member become deflected or distorted transversely to its axis of rotation, the provision of freedom of movement in that direction between the helical member and the float and between the float and the other guide means will prevent jamming when the float rises and falls.

The aforesaid helically shaped member may be provided with double-start quick-pitch parallel-sided threads and the float is provided with a member having a slot of small axial dimension for engaging said threads, and having the length between the ends of the slot greater than the diameter across the two-start threads, thereby providing a limited degree of freedom of movement between the slotted member and the threaded member in a direction at right-angles to the length of the latter.

The helically-shaped member, in addition to being engaged by the aforesaid slotted member, is also engaged, on both sides thereof, at a central location disposed axially away from said slotted member, by abutments formed on said float, thereby preventing oscillatory movement of the float about an axis extending parallel with the length of the aforesaid slot.

The quick-pitch threaded member may be arranged to extend through a central bore formed in the float, and a slotted plate attached to the float may be arranged to extend across one end of the bore, while a cross-piece attached to the float and carrying the aforesaid abutments may be arranged to extend across the other end of the bore.

The helically-shaped member may be formed by twisting either a flat strip or tube which has been compressed to provide two flat axially extending wing portions, or a strip of cruciform cross-section. In the latter case the abutments on the aforesaid cross-member are arranged to engage the ends of these limbs of the cruciform member which are at right-angles to the limbs engaged by the slot in the first said disc.

In any of the arrangements above, in which there is provided a rotatable helically-shaped member, there may be provided two upright strips arranged on either side of the float and arranged to engage slots in a part of the float, which slots are of such a depth as to permit the aforesaid degree of freedom of movement of the float at right-angles to its rectilineal movement. Preferably, the slotted part of the float has a comparatively small axial dimension. One of the strips may be arranged to engage the float at two points along the axial length of the float whereas the other strip is arranged to engage the float at one location, thus compensating for any departure from parallelism of the side faces of the two strips.

The following is a description of the invention as applied to a petrol level indicator for an aircraft tank, reference being made to the accompanying drawing, in which:

Figure 2 is a plan view of the top disc of the float with the operating strip in section;

Figure 3 is an under-plan view of the bottom disc;

Figure 1:
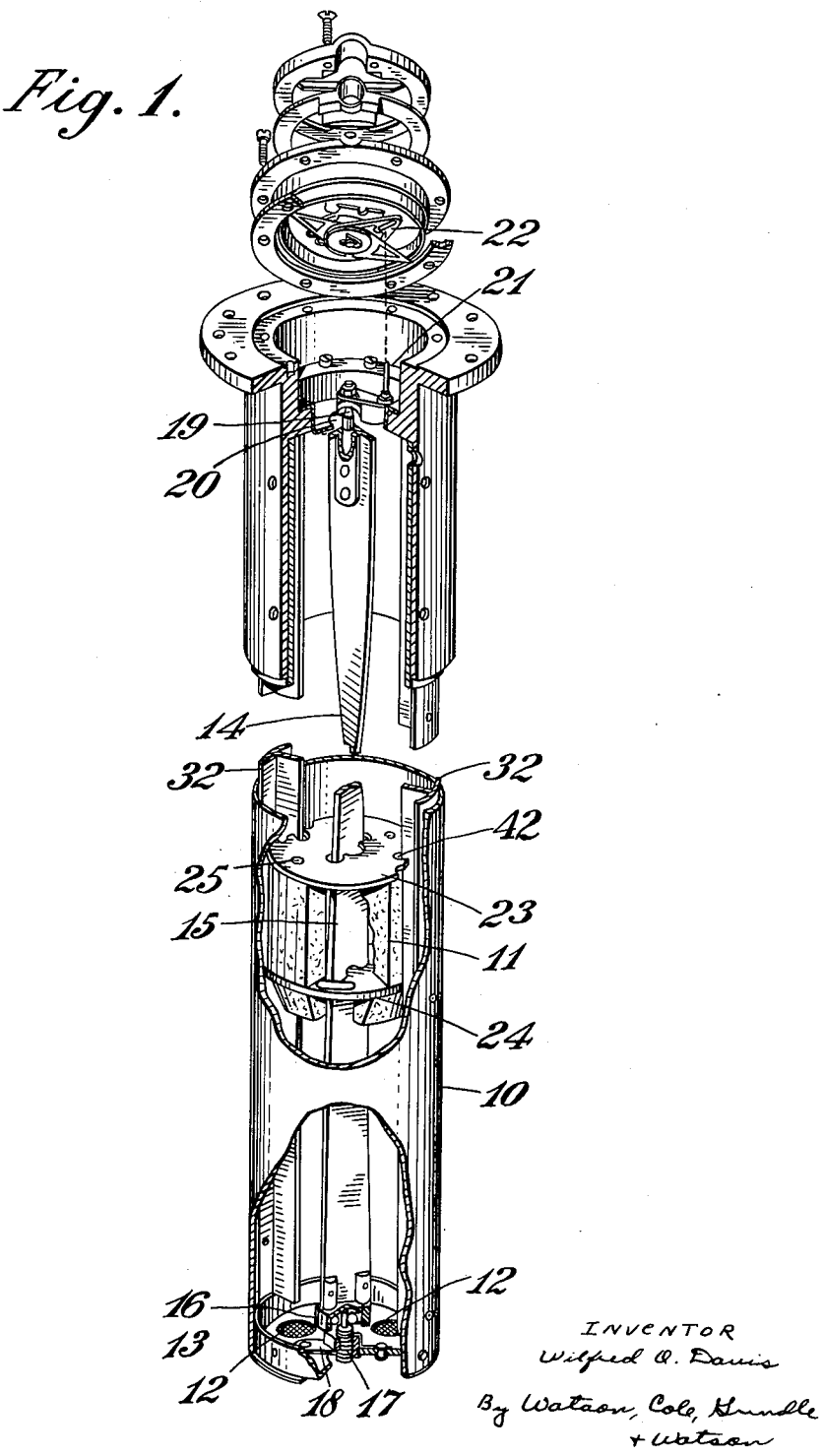
Figure 1 is a perspective exploded view of the assemblage, certain of the parts being shown broken away.

Figures 4 and 6 are similar views to Figure 2, showing alternative forms of operating strips, and Figures 5 and 7 are under-plan views of Figures 4 and 6 respectively.

A tube 10 is aranged to project into the tank and encircles a float 11 which moves up and down in the tube with the change of the level of the liquid therein, the tube being provided with suitable openings 12 in a bottom wall 13 for the ingress and egress of petrol. A twisted metal strip 14 extends through a bore 15 in the float and is rotatably mounted at each end of the tube in suitable bearings. For example, the lower end of the strip has secured to it a conical race 16 for a ball-bearing, the other race being provided by a conical pin 17 secured to a carrier 18 extending across the bottom of the tube. The upper end of the strip is provided with a spindle 19 extending through a bearing 20 and having fixed to its outer end a crank-pin 21 engaging a crank 22 forming part of a transmission for rotating a variable electric transmission connected with an indicator. The float is formed from a number of cork discs having a thin fibre disc 23 at the upper end thereof and another fibre disc 24 (hereinbefore being referred to as a cross-member) disposed between the two lower-cork discs, the whole assemblage being held together by pins having their ends riveted over washers 25. A slot 27 (see Figure 2) is cut in the cork discs on each side of a diameter, which slots are V-shaped in cross-section, but the fibre discs are arranged to extend across these slots. The upper fibre disc is provided with a diametrically extending slot 28 of such a size that the aforesaid twisted metal strip is a good sliding fit and of such a width as to allow a predetermined degree of relative radial movement. In order to reduce friction, the centre part of this slot is cut away at 29 so that the sides of the slot bear on the strip only adjacent the edges of the latter and the ends of the slots are preferably somewhat enlarged. The other fibre disc 24 is provided with a slot 30 somewhat in the shape of a dumb-bell, the waist of which provides abutments 31 on either side of the twisted metal strip 14, and prevents rocking of the float about an axis extending diametrically across the slot in the upper fibre disc.

Extending down the sides of the tubes are two T-section angle-strips 32 each arranged with a flange extending radially inwards along the same plane; these flanges are arranged to extend into the V-shaped slots 27 in the float and into slots 33 formed in the fibre disc 23, the width of which is such as to provide an easy sliding fit between the disc and the flanges. Likewise the radial dimensions of the slots 33 are such as to provide a substantial gap (as at 42 in Figure 1) between the ends of the slots and the edges of guide strip, thus permitting the freedom of movement of the float relatively to the guide strips in a direction at right angles to the lengths of the slots 28. Thus in effect the slots 28 and 33 operate as an Oldhams coupling between the guide strips 32 and helical strip 14 preventing relative rotation between the float and the guides but allowing lateral movement of the helical strip in all directions at right angles to the axis of rotation. The flanges of the guide strips 32 likewise extend into two slots 34 and 35 of the lower fiber disk 24, the slot 35 being considerably wider than the slot 34 which forms a good sliding fit with one of the flanges. This arrangement provides a three-point contact (33, 33, 34) between the float and said guide flanges, and thus permits a latitude in the parallelism of said flanges.

In the arrangement shown in Figures 4 and 5, the twisted metal strip 14 of the previous construction is replaced by a rod 36 of cruciform section for the purposes of rigidity, and instead of the upper fibre disc 23 being provided with a circular hole at its centre, it is provided with a rectangular hole 37 of greater width than the width across the limbs of the cruciform rod, while the lower disc 24, instead of being provided with a waist portion, as shown in Figure 3, has an enlarged aperture having abutment faces 38 which engage the ends of one limb of the cruciform section, and the other limbs are clear of the periphery of the aperture. The arrangement shown in Figures 6 and 7 conforms more closely with the arrangement shown in Figures 2 and 3, but in this instance, instead of a twisted strip 14 being provided, a tube 39 is compressed so as to provide two wing portions 40 for engaging the slot in the upper disc 23, the central opening of which is large enough to loosely accommodate the tubular portion 39 of the rod. The lower disc 24 is provided with a rectangular slot 41, the width across which is such that its sides slidably engage the tubular part 39, while its length is such that the end walls are clear of the ends of the wing portions 40.

I claim:

1. A float controlled apparatus comprising a float, means engaging portions of said float and constraining the float to move substantially rectilinearly, two apertured plates secured to said float and spaced apart in the direction of the rectilineal movement, a member extending through said apertured plates and having helically arranged faces, which member is mounted to rotate about the axis of the helix which is arranged parallel with said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement, said constraining means being adapted to prevent any transverse movement of said first named plate except movement of said plate in a direction at right angles to the direction of the said free relative movement between the plate and said member.

2. A float controlled apparatus comprising a float, means engaging portions of said float and constraining the float to move substantially rectilinearly without rotation, two apertured plates secured to said float spaced apart in the direction of the rectilineal movement, a member extending through said apertured plates and having helically arranged faces which member is mounted to rotate about the axis of the helix which is arranged parallel with said rectilineal movement and which member is fixed against axial movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement, said constraining means being adapted to prevent any transverse movement of said first named plate except movement of said plate in a direction at right angles to the direction of the said free relative movement between the plate and said member.

3. A float controlled apparatus comprising a float having an axial bore therein, means engaging portions of said float and constraining the float to move substantially rectilinearly, two apertured plates secured to said float across the ends of the bore, a member extending through said apertured plates and bore and having helically arranged faces which member is mounted to rotate about the axis of the helix which is arranged parallel with said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement, said constraining means being adapted to prevent any transverse movement of said first named plate except movement of said plate in a direction at right angles to the direction of the said free relative movement between the plate and said member.

4. A float controlled apparatus comprising a float, means engaging portions of said float and constraining the float to move substantially rectilinearly, two apertured plates secured to said float spaced apart in a rectilineal direction, a helically twisted flat strip extending through said apertured plates and mounted to rotate about the axis of the helix arranged parallel with the said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement, said constraining means being adapted to prevent any transverse movement of said first named plate except movement of said plate in a direction at right angles to the direction of the said free relative movement between the plate and said member.

5. A float controlled apparatus comprising a float, means constraining the float to move rectilinearly, two apertured plates secured to said float and spaced apart in a rectilineal direction, a tube pressed to provide two helically disposed wing portions, which tube is mounted to rotate about the axis of the helix which is arranged parallel with the rectilineal movement, the aperture in one of said plates being provided with opposed confining edge portions engaging opposite faces of said helical wings at locations on either side of the helix axis, said aperture also being of greater length transversely to the axis of the helix than the width of the tube including the wings, thereby affording free relative movement between the tube and the plate in a direction transverse to said axis, and the aperture in the other of said plates also being longer than the width of said tube including the wings and being provided with abutments oppostie one another and engaging points on the tube intermediate of its width, thereby preventing movement of said plate in a direction transverse both to said axis and to the direction of the aforesaid free movement.

6. A float controlled apparatus comprising a float, means constraining the float to move rectilinearly, two apertured plates secured to said float and spaced apart in the direction of the rectilineal movement, a member having a twisted cruciform section so as to provide helically arranged faces, which member is mounted to rotate about the axis of helices which is arranged parallel with said rectilineal movement, the aperture in one of said plates being provided with opposed confining edge portions engaging opposite helical faces of two limbs of said cruciform member at locations on either side of the helix axis, said aperture also being of greater length transversely to the axis of the helix than the width of the cruciform member, thereby affording free relative movement between the member and the plate in a direction transverse to said axis, and the aperture in the other of said plates also being longer than the width of said member and being provided with abutments opposite one another and engaging the ends of the other two limbs of the cruciform member, thereby preventing movement of said plate in a direction transverse both to said axis and to the direction of the aforesaid free movement.

7. A float controlled apparatus providing a float adapted to move freely in an up and down direction, two upright strips arranged on either side of the float and arranged to engage slots in a part of the float, which slots are of such a depth as to permit freedom of movement of the float at right-angles to the up and down movement, two apertured plates secured to said float spaced apart in the direction of the up and down movement thereof, a member extending through said apertured plates and having helically arranged faces, which member is mounted to rotate about the axis of the helix which is arranged parallel with said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement.

8. A float controlled apparatus providing a float adapted to move freely in an up and down direction, two upright strips arranged on either side of the float and arranged to engage slots in a part of the float, which slots are of such depth as to permit freedom of movement of the float at right-angles to the up and down movement, two apertured plates secured to said float spaced apart in the direction of the up and down movement thereof, a member extending through said apertured plates and having helically arranged faces, which member is mounted to rotate about the axis of the helix which is arranged parallel with said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement.

9. A float controlled apparatus comprising a float adapted to move freely in an up and down direction, two apertured plates secured to said float and spaced apart in the direction of the up and down movement, radially extending slots on the opposite side of each plate, two upright strips arranged on either side of the float and arranged to engage each slot, which slots are of such a depth as to permit freedom of movement of the float at right-angles to the up and down movement, one of which upright strips is arranged slidably to engage the wall of the slot on both plates while the other strip is arranged to engage a slot on one of said plates only, a member extending through the apertures in said plate and having helically arranged faces, which member is mounted to rotate about the axis of the helix which is arranged parallel with said rectilineal movement, the aperture in one of said plates being provided with opposed confining edge portions engaging opposite helical faces of said member at locations on either side of the helix axis, said aperture also being of greater length transversely to the axis of the helix than the width of the helical member, thereby affording free relative movement between the member and the plate in a direction transverse to said axis, and the aperture in the other of said plates also being longer than the width of said member and being provided with abutments opposite one another and engaging points on the helical member intermediate of its width, thereby preventing movement of said plate in a direction transverse both to said axis and to the direction of the aforesaid free movement.

WILFRED OWEN DAVIS.

REFERENCES CITED

The following references are of record in the file of this patent:

UNITED STATES PATENTS

| Number | Name | Date |
|---|---|---|
| 885,059 | Laursen | Apr. 21, 1908 |
| 1,064,954 | Andersen | June 17, 1913 |
| 1,070,973 | MacGregor | Aug. 19, 1913 |
| 1,664,558 | Hastings | Apr. 3, 1928 |

FOREIGN PATENTS

| Number | Country | Date |
|---|---|---|
| 9,115 | Great Britain | of 1914 |
| 9,724 | Great Britain | of 1902 |
| 93,958 | Germany | Aug. 25, 1923 |
| 511,015 | France | Sept. 17, 1920 |
| 545,660 | Germany | Feb. 18, 1932 |